(12) United States Patent
Worrel

(10) Patent No.: US 8,282,368 B2
(45) Date of Patent: Oct. 9, 2012

(54) CHECK VALVE

(75) Inventor: Peter Francis Worrel, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1047 days.

(21) Appl. No.: 11/843,087

(22) Filed: Aug. 22, 2007

(65) Prior Publication Data

US 2009/0050217 A1   Feb. 26, 2009

(51) Int. Cl.
F04B 39/10 (2006.01)

(52) U.S. Cl. ............... 417/571; 417/564; 137/512.1; 137/516.15

(58) Field of Classification Search .......... 417/564, 417/571; 137/512.1, 516.13, 516.15
See application file for complete search history.

(56) References Cited

U.S. PATENT DOCUMENTS

| 3,327,731 | A | * | 6/1967 | Kehler | 137/516.13 |
|---|---|---|---|---|---|
| 3,360,006 | A | * | 12/1967 | Kehler | 137/516.13 |
| 3,403,696 | A | * | 10/1968 | Pynchon | 137/516.13 |
| 3,463,184 | A | * | 8/1969 | Kohler et al. | 137/512.15 |
| 3,508,849 | A | * | 4/1970 | Weber | 417/454 |
| 3,961,868 | A | * | 6/1976 | Droege et al. | 417/550 |
| 3,981,636 | A | | 9/1976 | Aoki et al. | |
| 4,344,346 | A | | 8/1982 | Erickson et al. | |
| 4,402,342 | A | * | 9/1983 | Paget | 137/512.15 |
| 4,643,220 | A | * | 2/1987 | Hartshorn | 137/516.13 |
| 4,856,558 | A | * | 8/1989 | Kardos | 137/625.33 |
| 4,913,187 | A | * | 4/1990 | Woollatt et al. | 137/516.13 |
| 6,510,868 | B2 | * | 1/2003 | Penza | 137/516.23 |

FOREIGN PATENT DOCUMENTS

GB  0814603.7 A  8/2008
JP  2005-337208  12/2005

* cited by examiner

Primary Examiner — Charles Freay
Assistant Examiner — Patrick Hamo
(74) Attorney, Agent, or Firm — David Kelly, Esq.; Tung & Associates

(57) ABSTRACT

A check valve. An illustrative embodiment of the check valve includes a valve body, a plurality of discharge port openings having at least one of a non-uniform width and a non-uniform position extending through the valve body and a flexible valve disk disposed generally adjacent to the valve body.

20 Claims, 2 Drawing Sheets

CHECK VALVE

FIELD

The present disclosure relates; to check valves. More particularly, the present disclosure relates to a check valve which is suitable for use in vacuum or pressure pumps and is characterized by reduced operational noise.

BACKGROUND

Hybrid and electric vehicles in which the conventional internal combustion engine has been replaced with alternative propulsion technologies must use an alternative source of vacuum pressure for brake-boosted systems. The most common approach to provide vacuum pressure is by way of a stand-alone electric-driven vacuum pump. Vacuum pumps, however, are known to generate objectionable noise.

A common type of conventional vacuum pump includes a pump housing which contains a chamber in which reciprocates a piston. A suction check valve is provided between a suction conduit and the inlet of the chamber. A discharge check valve is provided between the outlet of the chamber and an exhaust conduit. Each of the suction check valve and the discharge check valve typically includes a valve body through which extends multiple discharge port openings of equal size or diameter. A flexible valve disk is positioned adjacent to the valve body.

In operation of the suction check valve, as the piston is displaced in one direction in the chamber, air flows from the suction conduit through the discharge port openings and against the valve disk, respectively, of the suction check valve to dislodge the valve disk from the valve body and thereby facilitate flow of the air into the chamber. This generates negative pressure in the suction conduit. At this time, the exhaust check valve remains closed as the valve disk engages the valve body of the exhaust check valve. As the piston is subsequently displaced in the opposite direction in the chamber, the suction check valve closes as the valve disk engages the valve body of the suction check valve. The air flows from the chamber through the open exhaust check valve and is discharged from the exhaust conduit. Due to the uniform diameter of the discharge port openings in the valve body of each of the suction check valve and the exhaust check valve, a noise is generated when each check valve closes as the valve disk engages the valve body.

SUMMARY

The present disclosure is generally directed to a check valve. An illustrative embodiment of the check valve includes a valve body, a plurality of discharge port openings of non-uniform width extending through the valve body and a flexible valve disk disposed generally adjacent to the valve body.

The present invention is further generally directed to a vacuum pump. An illustrative embodiment of the vacuum pump includes a pump housing having a suction conduit, a discharge conduit and a chamber between the suction conduit and the discharge conduit; a piston reciprocally mounted in the chamber; a motor engaging the piston; a suction check valve disposed between the suction conduit and the chamber; and a discharge check valve disposed between the chamber and the discharge conduit. Each of the suction check valve and the discharge check valve includes a valve body, a plurality of discharge port openings of non-uniform width extending through the valve body and a flexible valve disk disposed generally adjacent to the valve body.

The present disclosure is further generally directed to a method of reducing noise in a vacuum pump having a suction conduit, a discharge conduit, a chamber between the suction conduit and the discharge conduit and a piston reciprocally mounted in the chamber. An illustrative embodiment of the method includes providing a suction check valve between the suction conduit and the chamber and providing a discharge check valve between the chamber and the discharge conduit. Each of the suction check valve and the discharge check valve includes a valve body, a plurality of discharge port openings of non-uniform width and position extending through the valve body and a flexible valve disk disposed generally adjacent to the valve body.

BRIEF DESCRIPTION OF THE DRAWINGS

The disclosure will now be made, by way of example, with reference to the accompanying drawings, in which.

DETAILED DESCRIPTION

Figure 1:
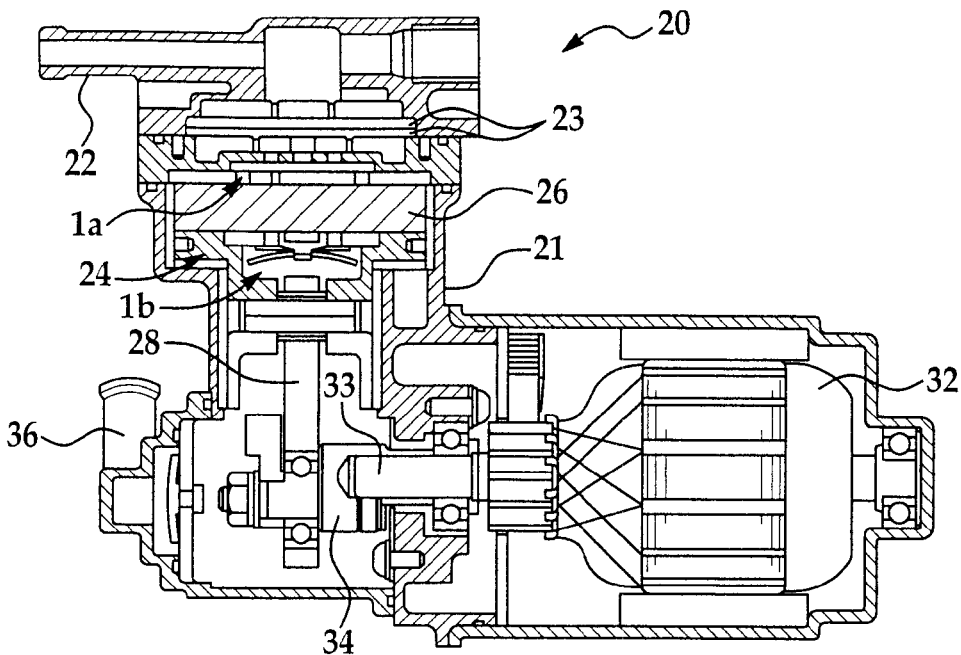
FIG. 1 is a sectional view of a vacuum pump, with a suction check valve and a discharge check valve according to the present disclosure provided in the vacuum pump.
Figure 2:
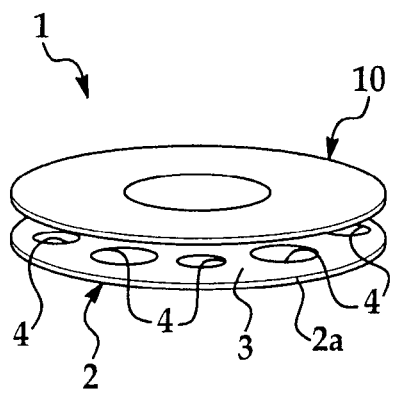
FIG. 2 is a perspective, partially schematic view of an illustrative embodiment of the check valve.

Referring initially to FIG. 1 of the drawings, a vacuum pump 20 which is suitable for implementation of an illustrative embodiment of the check valves (1a and 1b) is shown. The vacuum pump 20 is of the type which is commonly used to generate vacuum pressure for brake-boosted systems in hybrid and electric vehicles. However, it will be understood by those skilled in the art that the check valve 1 (FIG. 2) is applicable to other types of vacuum pumps as well as other types of apparatus in which unidirectional flow of air or other fluid is desired.

The vacuum pump 20 may have a conventional design and typically includes a pump housing 21 having a chamber 26. A piston 24 is reciprocally mounted in the chamber 26. A suction conduit 22 and a discharge conduit 36 are disposed in pneumatic communication with the chamber 26. A suction check valve 1a is provided in the pump housing 21 between the suction conduit 22 and the discharge conduit 36. A discharge check valve 1b is provided in the pump housing 21 between the discharge conduit 36 and the chamber 26. The design of the suction check valve 1a and the discharge check valve 1b will be hereinafter described. At least one filter 23 is typically provided between the suction conduit 22 and the suction check valve 1a.

A connecting rod 28 engages the piston 24. An electric motor 32 is provided in the pump housing 21 and has a drive shaft 33 which engages the connecting rod 28 through an eccentric cam 34. Accordingly, by operation of the motor 32, the drive shaft 33 rotates the cam 34, which reciprocates the connecting rod 28. The connecting rod 28, in turn, reciprocates the piston 24 in the chamber 26.

Figure 3:
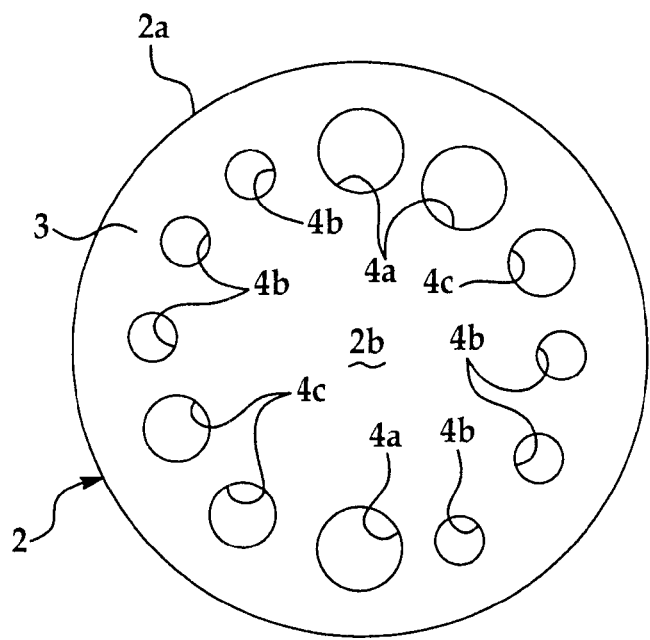
FIG. 3 is a top view of a valve body element of an illustrative embodiment of the check valve.

Referring next to FIGS. 2-5 of the drawings, an illustrative embodiment of the check valve 1 includes a valve body 2 which may be plastic, rubber or metal, for example. The valve body 2 may be generally cylindrical or circular and includes a valve body edge 2a. As shown in FIG. 3, the valve body 2 has a generally flat or planar disk engaging surface 3 having a valve body center 2b. Multiple discharge port openings 4 of non-uniform size, diameter and/or position extend through the valve body 2, between the valve body edge 2a and the valve body center 2b. As further shown in FIG. 3, the discharge port openings 4 include a first set of discharge port openings 4a and a second set of discharge port openings 4b. Each of the second set of discharge port openings 4b is smaller in diameter or width than each of the first set of discharge port openings 4a. The discharge port openings 4 may further include a third set of discharge port openings 4c, each of which has a diameter or width which is intermediate between that of each of the first set of discharge port openings 4a and each of the second set of discharge port openings 4b.

Figure 4:
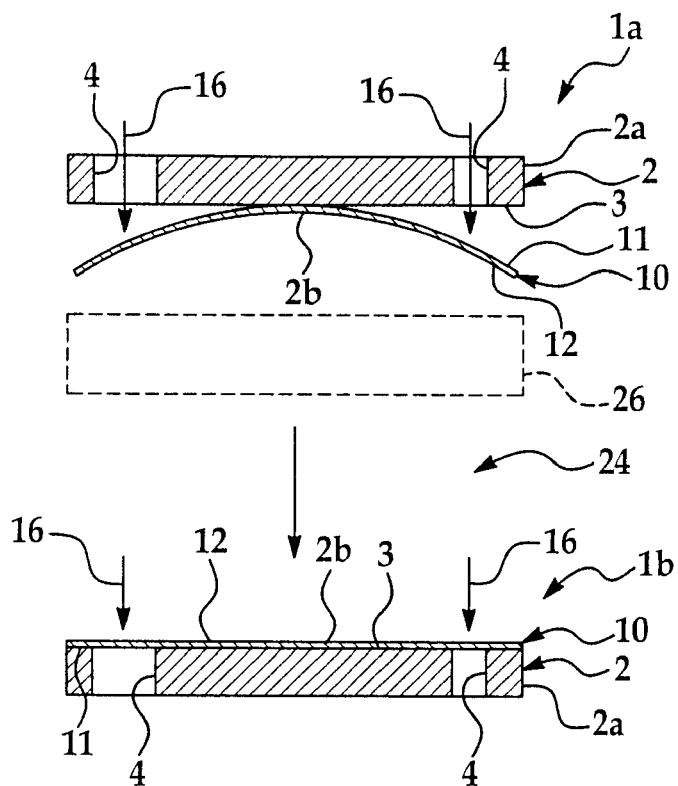
FIG. 4 is a sectional view of a suction check valve and a discharge check valve provided at an inlet end and a discharge end, respectively, of a chamber provided in the vacuum pump illustrated in FIG. 1, more particularly illustrating opening of the suction check valve and closing of the discharge check valve to facilitate flow of air into the chamber.
Figure 5:
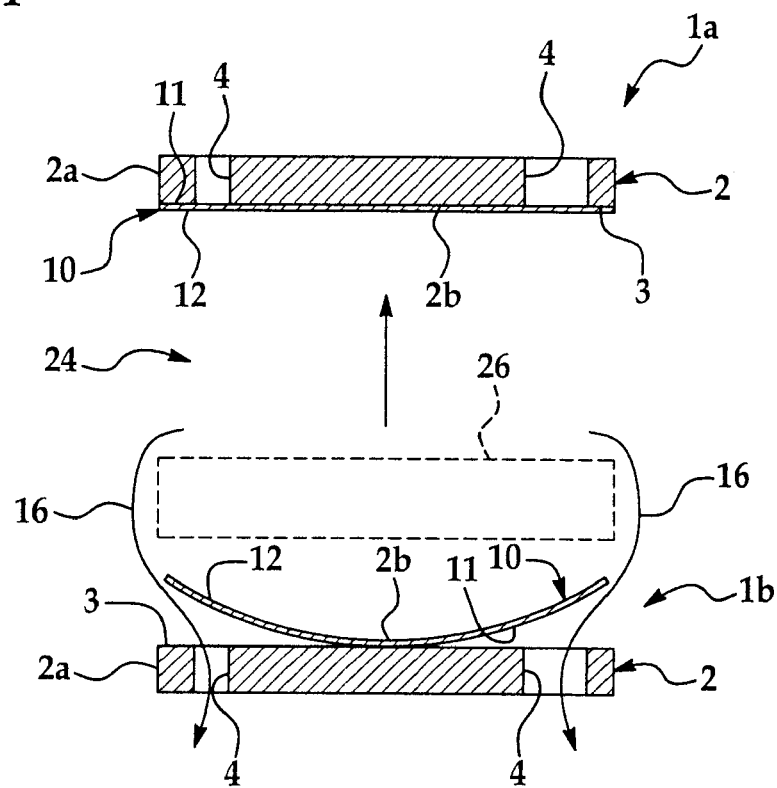
FIG. 5 is a sectional view of a suction check valve and a discharge check valve provided at an inlet end and a discharge end, respectively, of a chamber provided in the vacuum pump illustrated in FIG. 1, more particularly illustrating closing of the suction check valve and opening of the discharge check valve to facilitate flow of air from the chamber.

The check valve 1 includes a valve disk 10 which is disposed adjacent to the valve body 2. As shown in FIGS. 4 and 5, the center portion of the valve disk 10 may be attached to the valve body center 2b of the valve body 2 using any suitable attachment technique which is known to those skilled in the art. The valve disk 10 is a flexible or resilient material such as rubber, for example. As shown in FIGS. 4 and 5, the valve disk 10 includes a valve body engaging surface 11 which is oriented adjacent to the disk engaging surface 3 of the valve body 2 and an exposed surface 12 which is opposite the valve body engaging surface 11.

Referring next to FIGS. 1, 4 and 5 of the drawings, in typical application of the check valve 1, the suction check valve 1a is provided in the pump housing 21 of the vacuum pump 20 between the suction conduit 22 and the chamber 26 whereas the discharge check valve 1b is provided between the chamber 26 and the discharge conduit 36. As shown in FIGS. 4 and 5, the valve disk 10 of each of the suction check valve 1a and the discharge check valve 1b is oriented toward the chamber 26, whereas the valve body 2 of each of the suction check valve 1a and the discharge check valve 1b is oriented away from the chamber 26.

As the piston 24 (via actuation of the motor 32, drive shaft 33 and connecting rod 28 shown in FIG. 1) slides in the chamber 26 in the direction indicated by the arrow in FIG. 4, air 16 is drawn from the suction conduit 22 (FIG. 1) and through the discharge port openings 4 in the valve body 2 of the suction check valve 1a and into the chamber 26. The negative pressure which is generated on the suction side of the piston 24 in the chamber 26 dislodges the valve disk 10 from the disk engaging surface 3 of the valve body 2, unblocking the discharge port openings 4 and permitting flow of the air 16 through the discharge port openings 4 into the chamber 26. This generates negative pressure in the suction conduit 22 of the vacuum pump 20. Simultaneously, the positive pressure which is generated on the discharge side of the piston 24 in the chamber 26 presses the valve disk 10 against the disk engaging surface 3 on the valve body 2 of the discharge check valve 1b, closing the discharge check valve 1b and preventing flow of air 16 from the chamber 26 and through the discharge conduit 36.

As the piston 24 slides in the chamber 26 in the direction indicated by the arrow in FIG. 5, positive pressure which is generated on the suction side of the piston 24 pushes the valve disk 10 against the disk engaging surface 3 on the valve body 2 of the suction check valve 1a. This closes the suction check valve 1a and prevents backflow of air 16 from the chamber 26 into the suction conduit 22 (FIG. 1). Therefore, the closed suction check valve 1a maintains the negative air pressure which was induced in the suction conduit 22 during movement of the piston 24 which was heretofore described with respect to FIG. 4. Simultaneously, negative pressure which is generated on the discharge side of the piston 26 dislodges the valve disk 10 from the disk engaging surface 3 on the valve body 2 of the discharge check valve 1b. Accordingly, air flows from the chamber 26 through the discharge port openings 4 in the valve body 2 of the discharge check valve 1b and is discharged from the pump housing 21 through the discharge conduit 36 (FIG. 1). The cycle continues as the piston 24 again moves in the direction shown in FIG. 4 and generates negative pressure in the suction conduit 22.

Upon closing of the discharge check valve 1b at the beginning of movement of the piston 24 shown in FIG. 4 and closing of the suction check valve 1a at the beginning of movement of the piston 24 shown in FIG. 5, the valve body engaging surface 11 of the valve disk 10 strikes the disk engaging surface 3 of the valve body 2 of the corresponding check valve 1. However, due to non-uniformity in the diameters or widths of the discharge port openings 4 in the valve body 2, this sound is attenuated or reduced since contact between the valve disk 10 and the valve body 2 is non-uniform. This non-uniform contact results in reduced noise during operation of the vacuum pump 20.

While the illustrative embodiments of the disclosure have been described above, it will be recognized and understood that various modifications can be made to the embodiments and the appended claims are intended to cover all such modifications which may fall within the spirit and scope of the disclosure.

What is claimed is:

1. A check valve, comprising:
a valve body;
a plurality of discharge port openings having a non-uniform width with respect to at least another discharge port opening, said discharge port openings having respective central portions disposed circumferentially adjacent at a substantially same radial distance, said openings on a generally planar disk shaped surface of said valve body, said openings extending axially through said valve body; and
a flexible valve disk disposed generally adjacent to said valve body, said flexible valve disk overlying said discharge port openings.

2. The check valve of claim 1 wherein said valve body is generally cylindrical.

3. The check valve of claim 1 wherein said plurality of discharge port openings comprises a first set of discharge port openings each having a first width and a second set of discharge port openings each having a second width less than said first width of said first set of discharge openings.

4. The check valve of claim 3 wherein said plurality of discharge port openings further comprises a third set of discharge port openings each having a third width intermediate between said first width and said second width.

5. The check valve of claim 1 wherein said valve body has a valve body center and a valve body edge and said plurality of discharge port openings extends through said valve body between said valve body center and said valve body edge.

6. The check valve of claim 5 wherein said valve disk is attached to said valve body at said valve body center.

7. The check valve of claim 1 wherein said valve disk engages said disk shaped surface in a closed position of said check valve and disengages said disk engaging surface in an open position of said check valve.

8. A vacuum pump, comprising:
a pump housing having a suction conduit, a discharge conduit and a chamber between said suction conduit and said discharge conduit;
a piston reciprocally mounted in said chamber;
a motor engaging said piston;
a suction check valve disposed between said suction conduit and said chamber;
a discharge check valve disposed between said chamber and said discharge conduit; and
wherein each of said suction check valve and said discharge check valve comprises a valve body, a plurality of discharge port openings having a non-uniform width with respect to at least another discharge port opening, said port openings having respective central portions disposed circumferentially adjacent at a substantially same radial distance, said openings on a generally planar disk shaped surface of said valve body, said openings extending axially through said valve body, and a flexible valve disk disposed generally adjacent to said valve body, said flexible valve disk overlying said discharge port openings.

9. The vacuum pump of claim 8 wherein said valve body is generally cylindrical.

10. The vacuum pump of claim 8 wherein said plurality of discharge port openings comprises a first set of discharge port openings each having a first width and a second set of discharge port openings each having a second width less than said first width of said first set of discharge openings.

11. The vacuum pump of claim 10 wherein said plurality of discharge port openings further comprises a third set of discharge port openings each having a third width intermediate between said first width and said second width.

12. The vacuum pump of claim 8 wherein said valve body has a valve body center and a valve body edge and said plurality of discharge port openings extends through said valve body between said valve body center and said valve body edge.

13. The vacuum pump of claim 12 wherein said valve disk is attached to said valve body at said valve body center.

14. The vacuum pump of claim 8 wherein said valve disk engages said disk shaped surface in a closed position of said check valve and disengages said disk engaging surface in an open position of said check valve.

15. A method of reducing noise in a vacuum pump having a suction conduit, a discharge conduit, a chamber between the suction conduit and the discharge conduit and a piston reciprocally mounted in the chamber, comprising:
providing a suction check valve between the suction conduit and the chamber;
providing a discharge check valve between the chamber and the discharge conduit; and
wherein each of said suction check valve and said discharge check valve comprises a valve body, a plurality of discharge port openings having a non-uniform width with respect to at least another discharge port opening, said discharge port openings having respective central portions disposed circumferentially adjacent at a substantially same radial distance, said openings on a generally planar disk shaped surface of said valve body, said openings extending axially through said valve body, and a flexible valve disk disposed generally adjacent to said valve body, said flexible valve disk overlying said discharge port openings.

16. The method of claim 15 wherein said plurality of discharge port openings comprises a first set of discharge port openings each having a first width and a second set of discharge port openings each having a second width less than said first width of said first set of discharge openings.

17. The method of claim 16 wherein said plurality of discharge port openings further comprises a third set of discharge port openings each having a third width intermediate between said first width and said second width.

18. The method of claim 15 wherein said valve body has a valve body center and a valve body edge and said plurality of discharge port openings extends through said valve body between said valve body center and said valve body edge.

19. The method of claim 18 wherein said valve disk is attached to said valve body at said valve body center.

20. The method of claim 15 wherein said valve disk engages said disk shaped surface in a closed position of said check valve and disengages said disk engaging surface in an open position of said check valve.

* * * * *